United States Patent [19]

Edmondson

[11] 4,327,051
[45] Apr. 27, 1982

[54] METHOD OF MOLDING GUTTER FITTINGS

[75] Inventor: Ronald Edmondson, Otford, United Kingdom

[73] Assignee: Plastiers Limited, London, England

[21] Appl. No.: 922,200

[22] Filed: Jul. 6, 1978

[51] Int. Cl.³ .............................................. B29C 7/00
[52] U.S. Cl. ..................................... 264/318; 249/63; 249/64; 249/180; 264/334; 405/121
[58] Field of Search ................ 264/318, 334; 249/180, 249/63, 64

[56] References Cited

U.S. PATENT DOCUMENTS

| | | | |
|---|---|---|---|
| 2,948,031 | 8/1960 | Webb | 249/180 |
| 3,339,242 | 9/1967 | Lamb | 249/180 |
| 3,373,460 | 3/1968 | Ladney | 249/180 |
| 3,865,529 | 2/1975 | Guzzo | 249/180 |
| 4,019,711 | 4/1977 | Altenhof et al. | 249/180 |
| 4,136,150 | 1/1979 | Darnall | 264/318 |

FOREIGN PATENT DOCUMENTS 1244379 7/1967 Fed. Rep. of Germany ...... 249/180

*Primary Examiner*—James H. Derrington

[57] ABSTRACT

A plastics gutter fitting (8, 11) has at least one transverse groove (10,17) receiving a sealing strip (16) and an inwardly turned clipping nib (9,15) extending across at least one end of a said transverse groove (10,17). The fitting is molded using a three part core of which two outer parts (4,4') can be moved convergently relative to a central part (3) for releasing a molding (8) therefrom. This molding method enables the reentrant where a clipping nib (9,15) extends across an end of a transverse groove (10,17) to be molded integrally in the fitting.

9 Claims, 4 Drawing Figures

METHOD OF MOLDING GUTTER FITTINGS

This invention relates to gutter fittings and is more particularly concerned with such fittings made of synthetic plastics materials.

The invention is especially applicable to moulded plastics fittings in the form of brackets which are intended for supporting and making sealing engagement with the ends of lengths of guttering, whether these are arranged in line as continuations of each other or whether they meet at an angle, such as at the corner of a building. The invention is, however, also applicable to other gutter fittings, such as bends, running outlets and end caps which are intended for fitting to the end of a length of guttering and to drain pipe connections, whether these are located at the end of a length of guttering, at an intermediate point or at a corner.

Guttering systems in which the gutters and the fittings used are made of sythetic plastics materials or resins are well-known and many efforts have been made to improve both the gutters and the fittings. The present invention has amongst its objects the provision of improvements in the construction of the fittings.

Plastics guttering consists generally of extruded longitudinally extending channel sections arranged to be joined together and supported by moulded gutter fittings. The fittings should have inwardly turned lips for receiving the longitudinally extending edges of the channel sections and should be in sealing engagement with the gutter channel sections to prevent leakage of water.

In the past, various forms of seal have been proposed or used. Some of these have taken the form of strips of a resilient material which are secured by adhesive to the inner sides of the fittings so that they will resiliently engage and form seals with the outer sides of ends of gutters inserted into the fittings, while in other cases loose seals have been used which are engaged between the gutters and fittings. Various means have been proposed for holding such loose seals in position.

According to a first aspect of the present invention, there is provided a plastics gutter fitting comprising a body of generally channel section having an integral bracket part for attachment to a wall or the like, a groove formed transversely in the body for receiving a sealing member in the form of a length or strip of resilient material, and a pair of permanently fixed inwardly turned lips extending respectively over the ends of the groove, one or both of the inwardly turned lips including an inwardly turned clipping nib along its outer edge extending over the respective end(s) of the groove and adapted to engage over the sides of a gutter end inserted into the fitting, and the arrangement being such that a said length or strip of resilient material in a said groove is compressed therein when the end of a said gutter is introduced into the fitting and engaged beneath the clipping nib(s).

According to a second aspect of the present invention, there is provided a gutter fitting as defined above and including such a length or strip of resilient material received in the said groove. Each clipping nib extends over an end of the groove so that it is possible to produce a fitting in which less material is used than hitherto since the groove can be located very near an end of the gutter fitting and yet satisfactory engagement of the fitting with the gutter still be obtained. Hitherto, it has been necessary to space the groove inwardly of the gutter fitting by an amount sufficient that invwardly turned lips formed on the body outwardly of the groove can satisfactorily engage with the gutter. Preferably the lips and/or clipping nibs are continuous although this is not the case for certain applications, e.g. for running outlets.

Moreover, it is a feature of this aspect of the invention that the sealing member can be fitted in and will remain in its groove in the body of the fitting as a result of its own resiliency and/or the action of the integral inwardly-turned lips without the use of adhesive. The ends of the sealing member may lie close underneath the lips but generally they are spaced short distances below the lips. In either case, however, the lips reduce the risk of the ends of the members peeling out from the grooves, which is the usual way in which the members might otherwise become dislodged.

According to one of the preferred features of this aspect of invention the sealing member is formed on its inner side with a number of projecting ribs, three being particularly advantageous, and it is formed on its outer side with at least one groove. The combination of ribs and grooves helps allow the compression of the sealing ring when the gutter is fitted and the provision of three internal ribs with a single groove behind the central rib has been found to provide a particularly efficient seal, as well as other advantages.

According to a further preferred feature of the invention, the sides of this groove may be tapered slightly, so that the groove is wider at the bottom than at the top, and the sealing member is made so that it has a similar cross-section before it is inserted into the groove.

The inwardly turned lips may be permanently fixed to the body of the gutter fitting by, for example, gluing, but preferably are formed integrally therewith. When the latter is the case, it will be appreciated that the fitting possesses a groove formation and lip and nib formations at right angles to each other and it is impractical to mould such a fitting using a one piece core because it is virtually impossible to remove such a core from within the fitting. A five-or-more piece core might be used but this is complex and therefore expensive and time-consuming to use.

According to a third aspect of the present invention, there is provided a core for producing a moulding such as the gutter fitting defined hereinbefore which comprises a fixed core piece, and two movable core pieces located respectively at either side of the fixed core piece and arranged to move from a moulding position into a discharge position by movement thereof away from the fixed core piece and towards each other.

According to a fourth aspect of the present invention, there is provided a method of producing a plastics moulding such as the gutter fitting defined hereinbefore which comprises employing a core as defined above. The invention also embraces a gutter fitting made using the core or method of the present invention.

In the method of this invention the moulding is produced by injecting or pouring fluid material into a generally two part mould in which the core pieces are arranged in their moulding position. When the material has set to the shape of the mould the cope is removed and the two movable core pieces moved outwardly of the drag and the fixed core piece and towards each other into a position in which the moulding is removable therefrom. The core and method of this invention are particularly suitable for producing the gutter fittings defined hereinbefore having re-entrant freatures such as grooves and inwardly turned lips. The dimensions and angles of the inwardly turned lips are such that after a predetermined amount of movement of the movable core pieces the moulding is releasable from the movable core pieces, e.g. by "popping" therefrom.

An embodiment of the several aspects of the present invention will now be described, by way of example only, by reference to the moulding of a plastics gutter fitting, by reference to the accompanying drawings in which.

Figure 1:
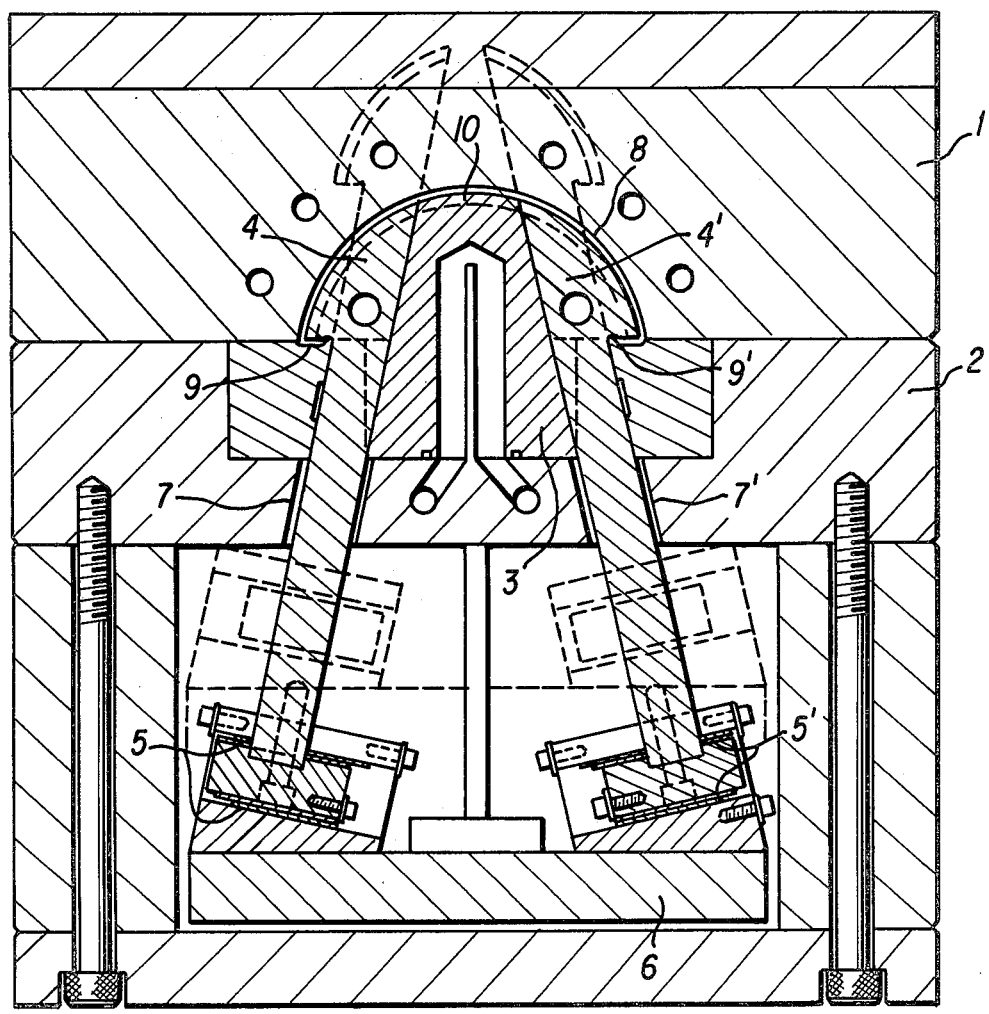
FIG. 1 shows in transverse sectional elevation a mould, including a moulding and core pieces.

Referring to FIG. 1, the mould consists of a steel cope 1, a drag 2, a fixed steel core piece 3 and movable steel core pieces 4, 4'. The movable core pieces 4,4' are mounted in linear bearings 5,5' in a support 6 which is vertically movable relative to the drag 2 and fixed core piece 3 by means of a hydraulic piston (not shown). The movable core pieces 4,4' are movable in convergent channels 7,7' formed between the fixed core piece 3 and the drag 2 from the position shown in solid ("moulding" position) to the position indicated by means of dotted lines ("discharge" position). The gutter fitting 8, in this case made of P.V.C., is formed with inwardly turned lip portions 9, 9' and a transverse groove 10. In use the mould and core are disposed in the position shown in solid and the plastics material is injected or poured into the mould space and there allowed to set. Subsequently the cope 1 is removed, the support 6 is moved vertically upwards so that the movable core pieces, travelling in the convergent channels 7, 7', move vertically upwards and towards each other. In so doing they move to the position shown by dotted lines whereat the gutter fitting 8 springs off the core pieces 4, 4'.

Thus by means of the core of the present invention there may readily be formed a moulding such as a gutter fitting having one or more transverse grooves and continuous longitudinally extending inwardly turned lips. Moreover, if, as is frequently the case in a gutter fitting, a transverse aperture is required in a bracket portion of the gutter fitting for receiving a securing screw or the like, then a suitable laterally extending stud may be provided on a head of one of the movable core pieces. When the dimensions are appropriately selected the fitting will still spring from the core pieces and stud thus to provide the required aperture without further treatment. Hitherto, such apertures have been formed by a manual drilling operation on a moulded gutter fitting.

Figure 2:
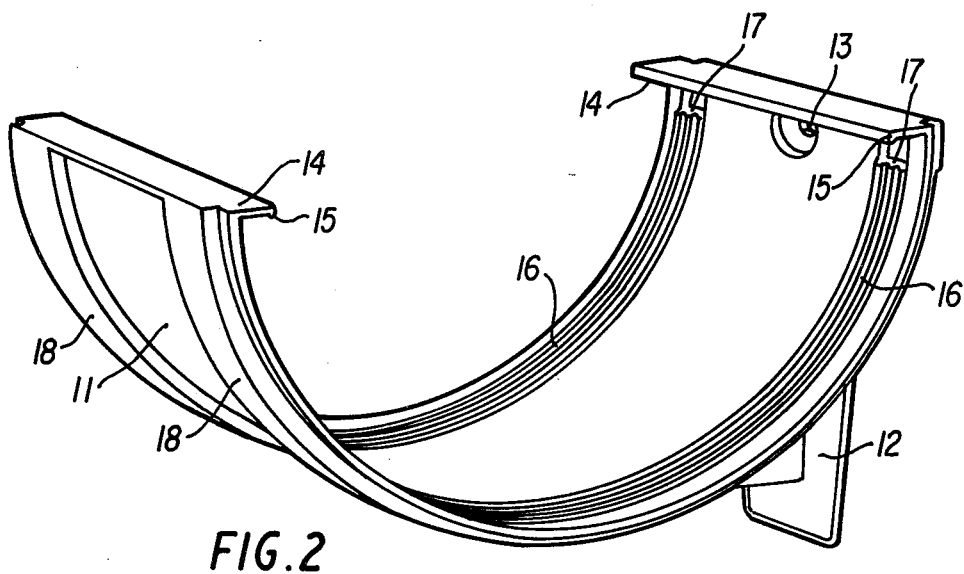
FIG. 2 is a perspective view of a gutter fitting with its sealing member, which exemplifies a first aspect of the invention.

Referring now to FIG. 2 the gutter fitting 8 shown comprises a body 11 formed of a suitable moulded synthetic plastics material, such as polyvinyl chloride, polypropylene or polyethylene. The body 11 is formed with an integral bracket 12, which enables it to be attached to a wall, fasciaboard or the like by means of a screw inserted through a hole 13. The body 11 also has two inwardly-turned lips one or each of which is downwardly turned to form clipping nibs 15. In use, the end of a length of gutter inserted into the fitting is held beneath the nibs 15 against which it is pressed by its engagement with a sealing strip 16.

The fitting shown is intended for connecting and supporting the ends of two lengths of gutter and it is provided with two such sealing members or strips 16, each of which is fitted in a groove 17 moulded in the fitting. The outer walls of these grooves, where they project from the main body 11, are shown at 18.

Figure 3:
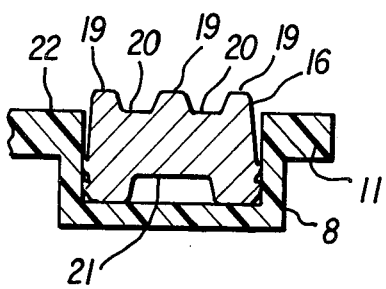
FIG. 3 is a detail section, to a larger scale, showing one form of sealing member in its groove.

The sealing members 16 are formed of a resilient material, such as a synthetic rubber. The section of one suitable sealing member according to this invention is shown in FIG. 3. It has three ribs 19 separated by grooves 20 on its inner face and on its outer face it is formed with a single groove 21 located below the central one of the ribs 19. The ribs 19 project above the bottom of the fitting (shown at 22) so that when an end of a length of gutter is pressed into the fitting, with its edges engaged under the lips 14, the ribs 19 are forced downwardly into the groove 17. Because the sealing member 16 engages against both sides of the groove 17 the effect is to compress the material of the sealing member both radially and longitudinally of the gutter so that the member presses against both the sides and the bottom of the groove 17 and also against the outer surface of the gutter, thus forming a particularly efficient seal between the fitting and gutter. The groove 21 allows deformation of the sealing member 16 when this occurs.

Before it is fitted in its groove the member 16 is slightly wider than the groove 17 so that it is held in the latter by its own resiliency, without the use of an adhesive.

Figure 4:
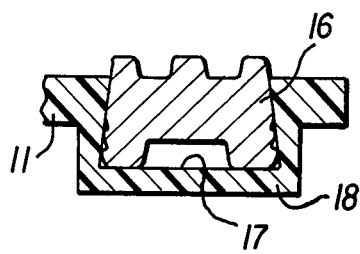
FIG. 4 is a view similar to FIG. 2 but showing a different form of sealing member in its groove, which is of a different section.

This effect can be improved by making the sealing member 16 and groove 17 of the section shown in FIG. 4 so that the groove and sealing member are naturally wider near the bottom of the groove than at the top.

The fitting shown in FIG. 2 could be lengthened and formed with a junction for connection to a down-pipe or it could be made to act as an end cap, in which case only one sealing member 16 would be needed.

According to another application of the invention the fitting 8 could provide a connecting bend for the guttering and this fitting could also be provided with a down-pipe connection.

In the construction shown, the sealing members 16 are shown as being slightly shorter than the grooves 17, but they may be made of the same length, or even so that they are slightly longer before they are fitted in position. This would help hold them in the grooves 17 but, even when the ends of the sealing members 16 are spaced below the lips 14 the latter, particularly with their downwardly turned clipping nibs 15, reduce the risk of the ends of the sealing members 16 peeling out of the grooves 17.

What is claimed is:

1. A method for molding and releasing from a mold gutter fitting made out of resilient plastic material which fitting comprises a channel shaped body provided with a transverse groove to receive resilient material and having inwardly turned lips extending over the ends of the groove, at least one of the lips being provided on its inner edge with a downwardly turned clipping nib extending over an end of the transverse groove so as to engage a side of a gutter inserted into the fitting, the improved method comprising using a main core and two side cores to mold the gutter fittings, and effecting relative movement between the core and side cores so as to draw the lips together until the stress thereby induced in the fitting causes the lips to spring away from each other to thereby disengage the clipping nib from the cores.

2. The method according to claim 1 wherein the side cores are moved in a converging manner relative to the main core and are used to mold the lips and clipping nib of such lengths as to permit automatic disengagement from the cores by release of the stress created by the relative movement of the cores.

3. The method according to claim 2 wherein a side core is provided with a stud to make an aperture in the gutter fitting.

4. The method according to claim 3 wherein the fitting is molded so as to produce an integral bracket.

5. The method according to claim 2 wherein both lips are provided with clipping nibs.

6. The method according to claim 2 wherein the gutter fitting is molded so as to provide a running outlet for connection to a drain pipe.

7. The method according to claim 1 wherein the resilient plastic material used to form the gutter fitting is polyvinyl chloride.

8. The method according to claim 1 wherein the resilient plastic material used to form the gutter fitting is polypropylene.

9. The method according to claim 1 wherein the resilient plastic material used to form the gutter fitting is polyethylene.

* * * * *